US009041586B2

(12) United States Patent
Tarhan et al.

(10) Patent No.: US 9,041,586 B2
(45) Date of Patent: May 26, 2015

(54) VECTORIZATION APPROACH TO ISOLATING LOCAL MAXIMA IN AN N-DIMENSIONAL DATASET

(75) Inventors: Kurt K. Tarhan, Laguna Niguel, CA (US); Gilbert C. Maxey, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 283 days.

(21) Appl. No.: 13/593,294

(22) Filed: Aug. 23, 2012

(65) Prior Publication Data

US 2014/0056528 A1    Feb. 27, 2014

(51) Int. Cl.
| G01S 13/90 | (2006.01) |
| G01S 13/00 | (2006.01) |
| H04L 1/06 | (2006.01) |
| G06K 9/00 | (2006.01) |
| G06K 9/46 | (2006.01) |

(52) U.S. Cl.
CPC .............. *G01S 13/00* (2013.01); *G01S 13/90* (2013.01); *H04L 1/06* (2013.01); *G06K 9/00* (2013.01); *G06K 9/4609* (2013.01); *G06K 9/4633* (2013.01)

(58) Field of Classification Search
CPC . G01S 13/90; G01S 13/9005; G01S 13/9011; G01S 13/9017; G01S 13/9023; G01S 13/9029; G01S 13/9035; G01S 13/9094; G01S 13/524–13/538; G01S 7/34; G01S 3/86; G01S 13/00; G06K 9/4609; G06K 4/4633; G06K 9/00; H04L 1/06
USPC ...................... 342/25 A–25 F, 25 R
See application file for complete search history.

(56) References Cited

U.S. PATENT DOCUMENTS

| 4,780,718 | A | * | 10/1988 | Hudson et al. ............... 342/25 A |
| 5,107,122 | A | * | 4/1992 | Barkan et al. ............ 250/370.01 |
| 5,173,702 | A | | 12/1992 | Young et al. |
| 5,175,554 | A | * | 12/1992 | Mangiapane et al. ........ 342/149 |
| 5,185,608 | A | * | 2/1993 | Pozgay ........................... 342/17 |
| 5,225,839 | A | * | 7/1993 | Okurowski et al. ........... 342/174 |
| 5,525,996 | A | * | 6/1996 | Aker et al. ..................... 342/104 |
| 5,563,601 | A | * | 10/1996 | Cataldo ....................... 342/25 A |
| 5,610,610 | A | * | 3/1997 | Hudson et al. ............... 342/25 F |
| 5,835,055 | A | * | 11/1998 | van der Kooij ............. 342/25 C |
| 7,245,250 | B1 | * | 7/2007 | Kalayeh ........................ 342/25 R |
| 7,259,715 | B1 | * | 8/2007 | Garren et al. ................. 342/179 |

(Continued)

FOREIGN PATENT DOCUMENTS

WO    WO 2014031412 A1 *  2/2014

*Primary Examiner* — John B Sotomayor
(74) *Attorney, Agent, or Firm* — Burns & Levinson LLP; Joseph M. Maraia

(57) ABSTRACT

Identification of maximum power scatters in an N-dimensional dataset generally requires two basic steps. The first step is to identify the max power scatters of the dataset and the second step removes neighboring power scatters (e.g., "hits") of lower power. Current naïve approaches utilize an inefficient and computationally intensive brute force implementation which requires multiple comparisons of each initial "hit" power to all "hits" of lesser power. Such brute force implementations require $2 \times N \times (M-1)!$ comparisons, where N is the number of dimensions and M is the number of "hits." Embodiments of the present disclosure utilize vectorization to identify a plurality of neighboring hits for each max power scatter and removes the neighboring hits of lesser power that are within a predetermined isolation region. Advantageously, embodiments of the present invention perform $M-1$ comparisons.

12 Claims, 5 Drawing Sheets

(56) References Cited

U.S. PATENT DOCUMENTS

| | | | |
|---|---|---|---|
| 7,411,540 B1 * | 8/2008 | Lopez et al. | 342/25 R |
| 7,456,780 B1 * | 11/2008 | Garren | 342/25 A |
| 2002/0126039 A1 * | 9/2002 | Dalton et al. | 342/26 |
| 2009/0052737 A1 * | 2/2009 | Lycett | 382/103 |
| 2010/0052977 A1 | 3/2010 | Sathyendra | |
| 2012/0035884 A1 * | 2/2012 | Ingram et al. | 702/181 |
| 2014/0056528 A1 * | 2/2014 | Tarhan et al. | 382/197 |

* cited by examiner

VECTORIZATION APPROACH TO ISOLATING LOCAL MAXIMA IN AN N-DIMENSIONAL DATASET

GOVERNMENT SUPPORT

The invention was supported, in whole or in part, by Government Contract No.: Withheld from Other US Government Agency. The Government has certain rights in the invention.

BACKGROUND

Many data processing algorithms require comparison analysis of raw data in order to provide a dataset that is refined, filtered, or enhanced for further processing. For instance, data retrieves from image capturing devices may need to be processed to, for example, provide a clear image, detect objects in the image, or provide higher resolution.

An example of an image capturing device is a Synthetic Aperture Radar (SAR) sensor. In a way, SAR is like a camera. However, rather than using light to create an image, SAR relies only on radar signals it sends out. This allows SAR to produce images in total darkness. SAR also takes advantage of radar's penetrating ability, allowing it to "see" through clouds, rain, snow, and fog. Generally, creating a SAR image involves mounds of data and tremendous computing power.

In general, a SAR antenna (from an airplane) sends out pulses of high-frequency radio waves (radar waves) toward the ground. In between the pulses, the antenna receives "backscatter"—radar waves that have bounced off objects on the ground. All backscatter pulses hold information, including how long each pulse took to make the round trip to and from the plane and if the SAR antenna is moving toward or away from the object on the ground.

From the travel time of each radar pulse a computer can calculate the distance to the object it bounced off, and from the time interval between adjacent pulses it can calculate how fast the pulse was moving toward or away from the object. The computer now has to figure out, from all the data it has stored, which pulses have bounced back from the same location. It does this by looking for a pattern. The computer is programmed to know that if an object is moving closer and closer at a set rate (and then farther and farther away at a set rate), then the time interval between pulses should also change at a set rate.

When the computer determines, from the vast amount of pulse data stored, certain pulses that fit a specific pattern, the computer knows that these pulses bounced off the same location (object) on the ground. Based on accurate knowledge of sensor position at the time the pulses that fit the pattern were sent and received, the computer determines the coordinate of the object on an image of a scene associated with the object being created by the computer.

Although, the object's coordinate on the image is determined, the brightness of the object is still not known. SAR determines the brightness by the intensity of the signal it receives. An object such as a tree absorbs some of the radar energy and so it appears gray. A metal object oriented toward the SAR antenna reflects a lot of the energy back, so it appears bright.

SUMMARY

An embodiment of the present disclosure is a method, system, or computer readable medium, with program codes embodied thereon, for local maxima detection. The embodiment includes an interface that is configured to receive at least one array of available candidate hits. Each hit includes a location in N dimensions and a power value. Further, the array of candidate hits is sorted based on the power value. In addition, the embodiment includes a neighboring hits module configured to, for each candidate hit of the array, identify a plurality of neighboring hits of the candidate hit in the array of available candidate hits. The embodiment also includes a candidate hit removal module configured to remove a subset of the plurality of neighboring hits within an isolation region about the candidate hit from the array of available candidate hits.

Each available candidate hit may represent a pixel described entirely by a location in at least two dimensions and a power value corresponding to an intensity.

The neighboring hits module may be further configured to identify a plurality of neighboring hits of the candidate hit by beginning from the candidate hit having the greatest power value relative to the other candidate hits in the array of available candidate hits.

The embodiment may further include a vector location module configured to, for each of the N-dimensions of the neighboring hits, compute a vector representing a location of the neighboring hits relative to the location of the candidate hit. The embodiment may also include a vector clipping module configured to clip remaining neighboring hits to a clipping region about the candidate hit. For example, the clipping region is a region bordering the isolation region.

In certain situations, resources may be limited. For instance, memory allocated for local maxima detection may be limited. Thus, the embodiment may include an absolute value vector converter configured to compute an absolute value of the N vectors for each of the neighboring hits relative to the candidate hit and a vector clipping module configured to, for each of the N vectors, clip remaining neighboring hits to a clipping region about the candidate hit.

Further, the embodiment may include a vector collapsing module configured to represent the location of the neighboring hits relative to the location of the candidate hit in a 1-dimensional location array. Also, the embodiment may include a vector masking module configured to apply a mask to the 1-dimensional location array. The embodiment utilizes the mask to remove neighboring hits within the isolation region about the candidate hit from the 1-dimensional location array and the array of available candidate hits.

For instance, the vector masking module may be further configured to i) create the mask using a 1-dimensional description of a predetermined region and the 1-dimensional location array, wherein the mask is an array of values, each value being either a 1 or 0 and ii) apply the mask to the power array of neighboring candidate hits. In this case, the predetermined region includes at least the isolation region and the clipping region.

It should be understood that embodiments of the present invention can be implemented in the form of a method, system, apparatus, or computer readable medium with program codes embodied thereon, for maximum location detection. For ease of reading, the term "system" is used in various portions of the description and may represent some or all forms of embodiments and implementations of the present invention, such as systems, method, apparatuses, devices, computer readable media, network nodes, and networks.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the disclosure follows.

Identification of maximum power scatters in an N-dimensional dataset generally requires two basic steps. The first step is to identify the max power scatters of the dataset and the second step removes neighboring power scatters (e.g., "hits") of lower power. Current naïve approaches utilize an inefficient and computationally intensive brute force implementation which requires multiple comparisons of each initial "hit" power to all "hits" of lesser power. Such brute force implementations require $2 \times N \times (M-1)!$ comparisons (traditionally expensive operations), where N is the number of dimensions and M is the number "hits." Embodiments of the present disclosure utilize vector operations to identify a plurality of neighboring hits for each max power scatter and remove the neighboring hits of lesser power that are within an isolation region about the candidate hit. Advantageously, embodiments of the present invention limit the number of comparisons to $M-1$ comparisons.

Example embodiments of the present disclosure include methods, systems, or computer readable media, with program codes embodied thereon, for local maxima detection. For example, embodiments include an interface that is configured to receive at least one array of available candidate hits. Each hit includes a location in N dimensions and a power value. For example, the location, in the case of a 2D image, is a location relative to one corner of the image (usually the upper or lower left corner). As will be described in further detail below, embodiments of the present disclosure transforms these "absolute" coordinates into a relative coordinate, relative to a particular candidate hit. Further, the array of candidate hits is sorted based on the power value. In addition, the embodiments include a neighboring hits module configured to, for each candidate hit of the array, identify a plurality of neighboring hits of the candidate hit in the array of available candidate hits. The embodiments also include a candidate hit removal module configured to remove a subset of the plurality of neighboring hits within an isolation region about the candidate hit from the array of available candidate hits.

Figure 1:
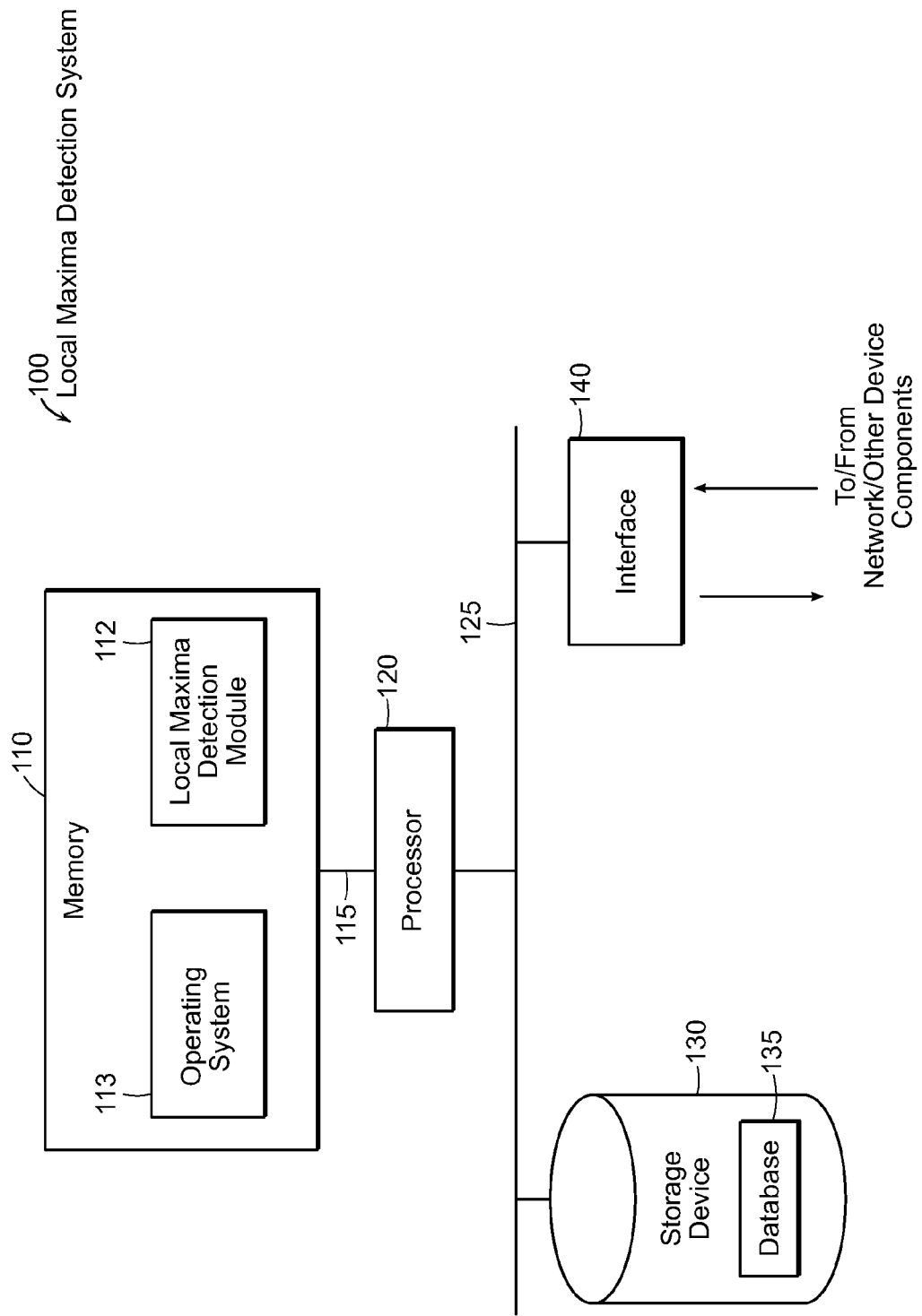
FIG. 1 is a block diagram of a local maxima detection system in accordance with an example embodiment of the present disclosure.

FIG. 1 is a block diagram of a local maxima detection system 100 that may be used in connection with an embodiment of the present disclosure. The local maxima detection system 100 includes a memory 110 coupled to a processor 120 via a memory bus 115, and a storage device 130 and an interface 140 coupled to the processor 120 via an input/output (I/O) bus 125. It should be noted that the local maxima detection system 100 may include other devices, such as keyboards, display units and the like. The interface 140 interfaces the local maxima detection system to a network or other components of a device and enables data (e.g., packets) to be transferred between the local maxima detection system 100 and devices in the network or other components of a device. To that end, the network interface 140, may include conventional circuitry that incorporates signal, electrical and mechanical characteristics, and interchange circuits to interface with physical media of the network and protocols running over that media. The storage device 130 is a conventional storage device (e.g., a disk) capable of storing, inter alia, array(s) of available candidate hits, neighboring hits, predetermined isolation regions, power values, and location information.

The network may be a communication network (not shown) (e.g., internet) that includes a collection of communications links interconnecting a plurality of nodes, such as communication units, access points, intermediate nodes, and the location maxima detection system 100 to form an internetwork of nodes. These internetworked nodes may communicate by exchanging data packets according to a pre-defined set of network protocols, such as the Transmission Control Protocol/Internet Protocol (TCP/IP) and the Session Initiation Protocol (SIP). A network protocol as used herein is a formal set of rules that define how data is exchanged between nodes in a communication network.

As will be described in more detail below, the local maxima detection system 100 may be used for local maxima detection. For instance, the local maxima detection system 100 may utilize vector operations to identify a plurality of neighboring hits for max power scatterers (e.g., objects) and removes associated neighboring hits of lesser power for each max power scatterer that are within an isolation region. Before describing the local maxima detection system in detail, a description of the communication network (not shown) is provided. It should be noted that the local maxima detection system 100 may be employed in other network topologies or other applications, such as single processor machines.

The intermediate nodes are typically conventional intermediate nodes, such as routers. The access points contain logic that enables the communication units to transfer information (e.g., data) between the communication network, communication units, and local maxima detection system 100. To that end, the access points include circuitry configured to transmit and receive signals (e.g., radio frequency (RF) signals) that carry the information between the access points, communications units, and local maxima detection system 100 via wired/wireless links. Examples of access points that may be used include certain Institute of Electrical and Electronic Engineers (IEEE) 802.11 compliant access points as well as certain cellular telephone wireless systems that support the transfer of traffic (e.g., data traffic). Other forms of access points now known or hereafter developed are contemplated to be operable with embodiments of the present disclosure.

Communication units may be conventional communication units, such as laptop computers, desktop computers, wireless transmit/receive units (WTRUs) (e.g., wireless telephones and personal digital assistants (PDAs)), IP telephones, and the like, that enable audible and/or visual communications to be converted into signals that are transferred to the access points via wired/wireless links. The access points interface the communication units and local maxima detection system with the communications network and enable signals to be transferred between the communication units, local maxima detection system 100, and the communications network. Specifically, the access points convert signals received from communication units and the local maxima detection system 100 vial wired/wireless links into data packets that are transferred onto the network, as well as convert packets received from the network into signals that are transferred to the communication units and local maxima detection system 100. It should be noted that embodiments of the present disclosure may be adapted to work with fixed as well as mobile devices that are able to communicate via the communication network.

The memory 110 is an example computer-readable medium, optionally implemented as a Ram employing RAM devices, such as DRAM devices and/or flash memory devices. The memory 110 contains various software and data structures used by processor 120, such as software and data structures that implement aspects of the present disclosure. Specifically, the memory 110 may store software configured to serve as an operating system 113 or provide a local maxima detection module 112. The operating system 113 can be used to functionally organize the local maxima detection system 100 by invoking operations in support of processes and services executing on the local maxima detection system 100, such as local maxima detection module 112. The local maxima detection module 112, as will be described below, may include non-transitory computer-executable instructions for local maxima detection.

The storage device 130 may include a database 135, which may be implemented in the form of a data structure that is configured to hold various information used for local maxima detection, such as array(s) of available candidate hits, neighboring hits, predetermined isolation regions, power values, and location information.

Figure 2:
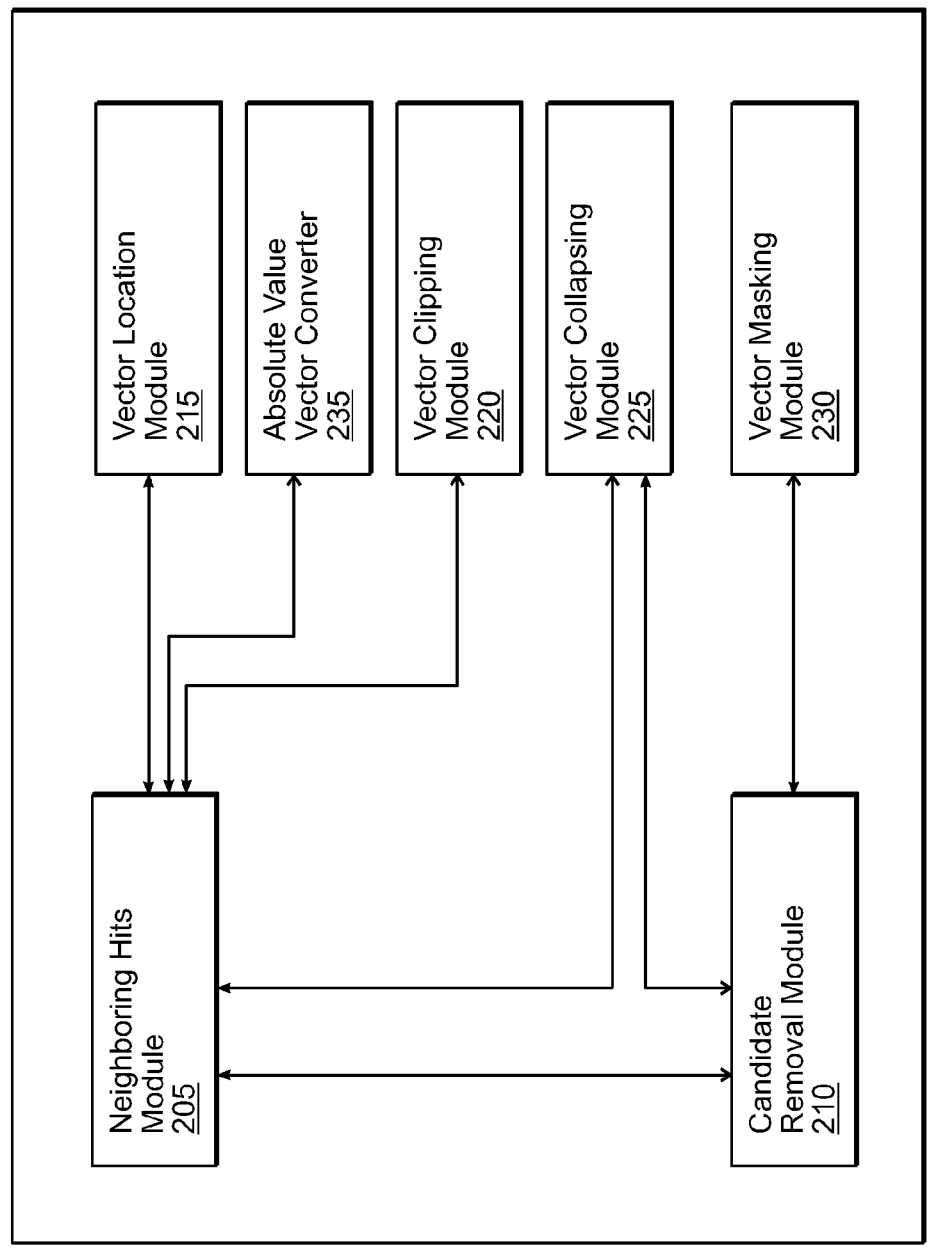
FIG. 2 is a block diagram of a local maxima detection module in accordance with an example embodiment of the present disclosure.

FIG. 2 is a block diagram of a local maxima detection module 212 that may be used in connection with an embodiment of the present disclosure. The local maxima detection module includes a neighboring hits module 205, candidate removal module 210, vector location module 215, vector clipping module 220, vector collapsing module 225, vector masking module 230, and absolute value vector converter 235.

The local maxima detection module 212 receives data from interface 140. As stated above, data may be associated with data captured from an image capturing device such as a Synthetic Aperture Radar (SAR) sensor. For instance, the local maxima detection module 212 receives an array of available candidate hits. The array may include information associated with location information associated with an N-dimensional image captured by the image capturing device. For ease of explanation, the following description will describe an example embodiment of the present disclosure having received information associated with data for a two-dimensional captured image. However, it should be noted that embodiments of the present disclosure operate with N-dimensional data (e.g., image data, for instance a 3D-image).

In an example scenario, the interface receives information associated with each pixel of a two-dimensional captured image. For example, the interface receives arrays associated with the x-coordinate, y-coordinate, and power value (e.g., intensity) of pixels of a captured image (e.g., candidate hits). As stated above, in a SAR image, the coordinate of a scatterer (e.g., object) on the image is determined, but the brightness of the point is still not known. SAR determines the brightness by the intensity of the signal it receives. An object such as a tree absorbs some of the radar energy and so it appears gray. A metal object oriented toward the SAR antenna reflects a lot of the energy back, so it appears bright. Thus, example embodiments of the present disclosure assist in identifying such bright spots in order for further processing, such as focusing such metal object in the captured image. In other words, the array of candidate hits may be associated with pixels having a power greater than a predetermined threshold value.

Figure 3A:
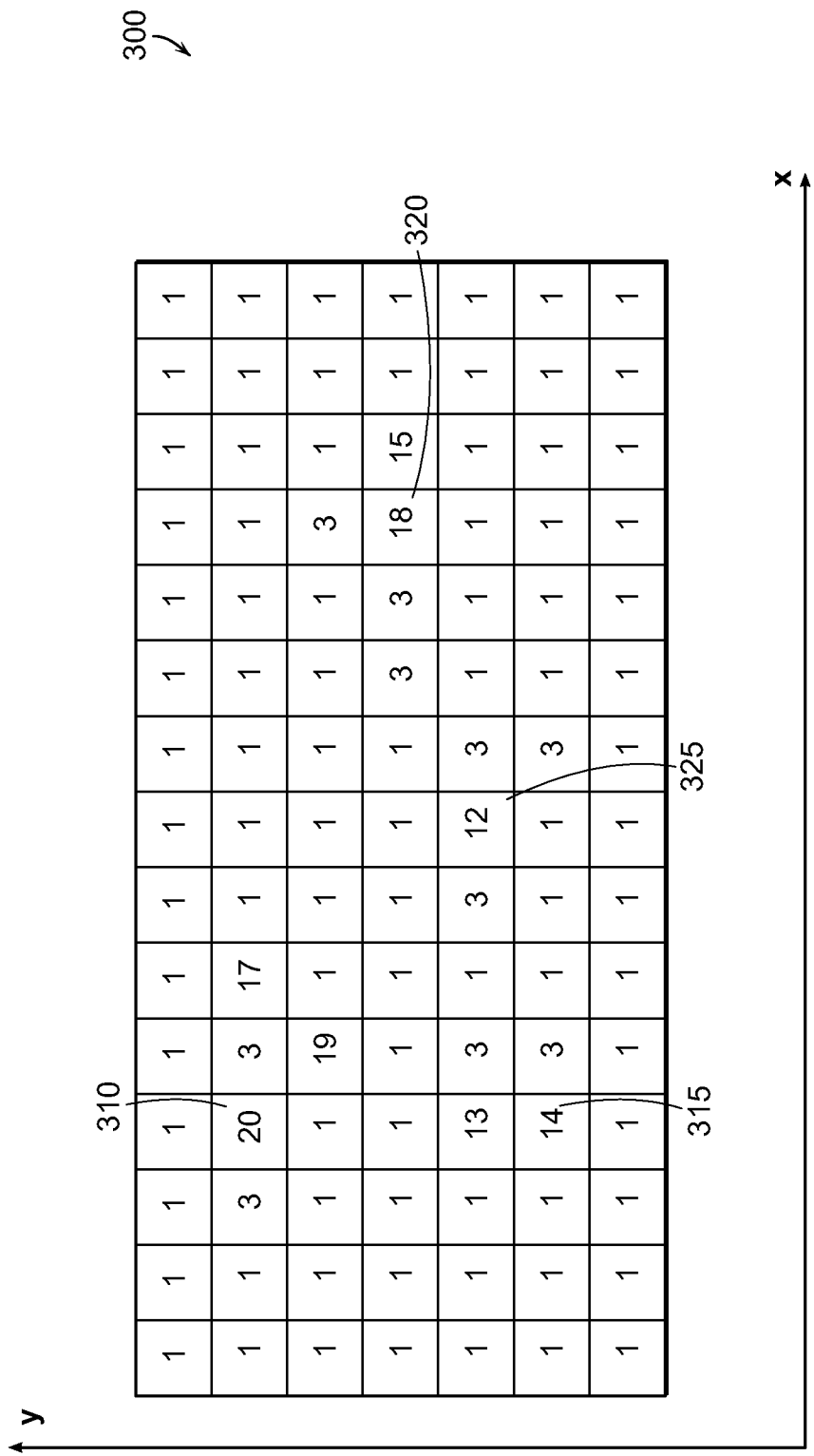
FIG. 3A illustrates a plot diagram of power values associated with a two-dimensional captured image in accordance with an example embodiment of the present disclosure.

In an example embodiment, the interface receives the array and passes the array to the neighboring hits module 205. Generally, when the data is received it is sorted based on the power value (e.g., intensity of each pixel of an image). However, if the data is not sorted based on the power value, the neighboring hits module 205 may automatically sort the data based on the power value (e.g., from highest to lowest). Once the data is received, for each candidate hit in the array of candidate hits, the neighboring hits module 205 is configured to identify neighboring hits. For example, FIG. 3A illustrates a plot diagram of power values associated with a two-dimensional captured image 300. In this example, an array sorted by power hits would be sorted with candidate hit (e.g., pixel) 310 having a power value of 20 as the first entry of the array. The neighboring hits module 205 then would identify all candidate hits neighboring candidate hit 310 (i.e., neighboring hits). The neighboring hits may be within a specific distance from candidate hit 310 or may be all hits no matter the distance from candidate hit 310. In this example, neighboring hits module 205 begins identifying neighboring hits of the candidate hit in the array(s) that has the greatest power (e.g., 20).

Utilizing the identified neighboring hits, the candidate hit removal module 210 removes all neighboring hits from the array of candidate hits that are within an isolation region about candidate hit 310. The isolation region may be characterized by any shape and need not be symmetric. In SAR applications, however, the isolation region is generally symmetric and consists of the union of a rectangle with two lines intersecting the candidate hit and the centers of each side of the rectangle and extending outside the rectangle. The purpose of the two lines extending outside the rectangle is that a target (e.g., scatterer) may have sidelobes which may extend like a cross. In SAR applications, utilizing such a method prevents embodiments of the present disclosure from considering the sidelobes as separate targets, where the sidelobes are, in fact, artifacts of the same target.

In order to determine which neighboring hits are within the isolation region, the candidate hit removal module utilizes information provided by the vector collapsing module 225, and vector masking module 230.

The vector location module 215 provides information associated with the location of the neighboring hits relative to the location of, in this example, candidate 310 (e.g., the first candidate hit in the array, once the array is sorted based on power). The vector location module 215 computes a vector for each dimension associated with the neighboring hits (e.g., x-dimension and y-dimension for a 2D-image) relative to the location of candidate hit 310.

Figures 3B, 4:
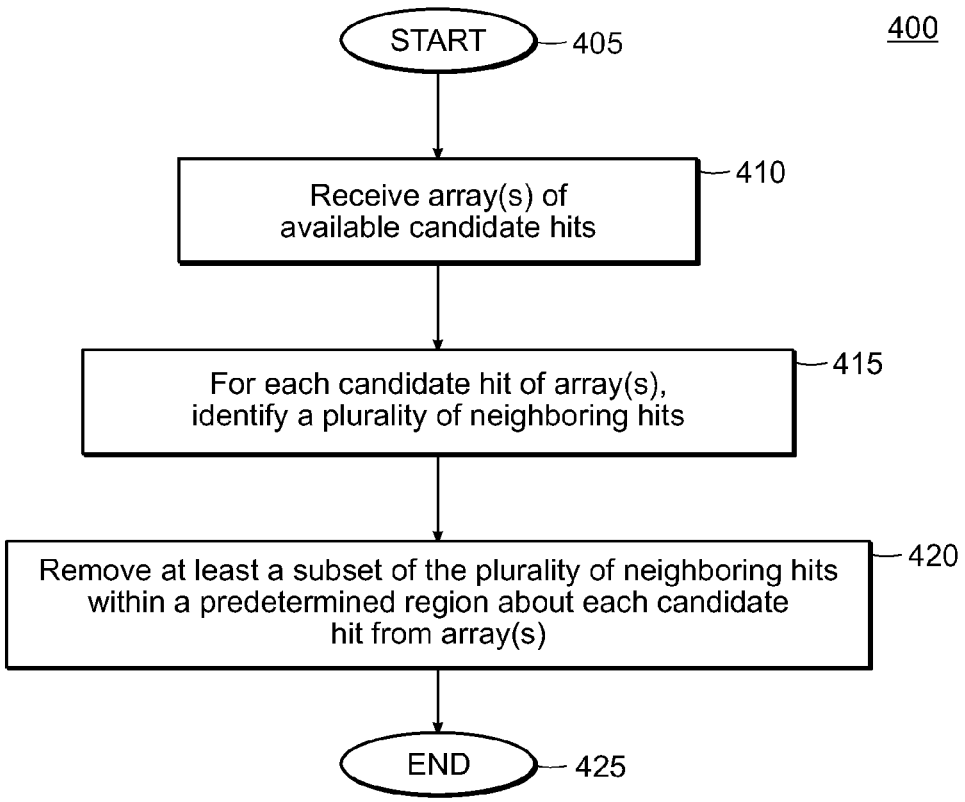
FIG. 3B illustrates a plot diagram of a predetermined region about a candidate hit corresponding to a two-dimensional captured image with each pixel listed in numeric order in accordance with an example embodiment of the present disclosure.
FIG. 4 is a flow diagram of an example method for identifying local maxima according to an example embodiment of the present invention.

Once the location of each of the neighboring hits relative to candidate hit 310 is computed, the vector collapsing module 215 represents the location of the neighboring hits with respect to the location of the candidate hit in a 1-dimensional location array. For instance, generally, candidate hits associated with a two-dimensional image require an array, for each dimension, to define the location of the candidate. FIG. 3B illustrates a 2-dimensional image 301 including pixels 0-76. Each pixel 0-76 is listed in order from the bottom left of image 301 to the top right of image 301. By listing the pixels in order, vector collapsing module 215, in this example, is able to represent each candidate hit associated with each pixel in a 1-dimensional array of length 75. In other words, the element in the 1-dimensional array at array[0] is associated with the pixel '0'.

Further, the vector masking module 230 then applies a mask to the 1-dimensional location array. The mask removes neighboring hits within the isolation region about the candidate hit from the 1-dimensional array and array of available candidate hits. In one example, the mask is generated using a 1-dimensional description of a predetermined region (a region including at least the isolation region and the clipping region) and the 1-dimensional location array. In other words, the mask is an array of values, having a value of either a '1' or '0'. The elements of the mask array are given a value of '0' if the element corresponds to a candidate hit within the isolation region. All other elements are given a value of '1'. The vector masking module may then map 1-dimensional location array into the mask. For instance, the mapping may simply be a vector table lookup of the 1-dimensional array using the 1-dimensional predetermined region array. Thus, the resulting mask array will have the same length as the 1-dimensional location vector, with values of '0' or '1', with '0' corresponding to candidate hits within the isolation region. The mask array may then be applied to the candidate power vector using vector multiplication. The resulting power array contains both non-zero and zero values, with non-zero values representing surviving candidate hits.

Clipping is performed to limit the size of a region associated with all the neighboring candidate hits that must be stored in memory. Neighboring hit locations, relative to the candidate hits, are clipped to a clipping region that borders the isolation region. Neighboring hits close to the candidate hit, are unaffected by the clipping operation. Neighboring hits far away from the candidate hit are clipped to the clipping region. For instance, referring to FIG. 3B which illustrates a predetermined region, the isolation region 302 includes the shaded elements. The edge elements of the predetermined region includes the clipping region 303

In certain embodiments, minimizing memory utilization is a high priority. In such a scenario, the absolute value vector module computes an absolute value of the N-vectors (e.g., x-dimension and y-dimension for a 2D image) associated with the location of the neighboring hits relative to candidate hit 310. In other words, all neighboring hits are relocated to a region in the upper right quadrant of a coordinate system with the candidate hit 310 being at the origin of such a coordinate system. Thus, the 1-dimensional location array, as described above, may be significantly reduced in size because it would only represent a single quadrant.

Once all the neighboring hits of candidate hit 310 are removed, a next hit of the array associated with available candidate hits is selected. As stated above, the candidate hits are sorted based on power. Referring to FIG. 3A, the next candidate hit selected is candidate hit 320, assuming that the candidate hit associated with the power value 19 was removed from the array because it was within the isolation region 302 about candidate hit 310. Subsequent to all neighboring hits of this candidate hit 320 being removed from the array of available candidate hits as described above, candidate hit 315 is selected. Similarly, all neighboring hits of candidate hit 315 are removed, and candidate hit 325 is then selected. This process repeats until all candidate hits are processed.

FIG. 4 is a flow diagram of an example method 400 for identifying local maxima. At 405, the method 400 begins. At 410, the method 400 receives an array of available candidate hits. For each candidate hit of the array, the method 400, at 415, identifies a plurality of neighboring hits. At 420, the method 400 removes a subset of the plurality of neighboring hits within an isolation region about each candidate hit. At 425, the method 400 ends. It should be noted that in one example iteration of method 400 with respect to a candidate hit, no hits may be eliminated. For instance, a candidate hit may not have any neighboring candidate hits within a large number of cells of the candidate hit. In this case, no candidate hits are removed.

Figure 5:
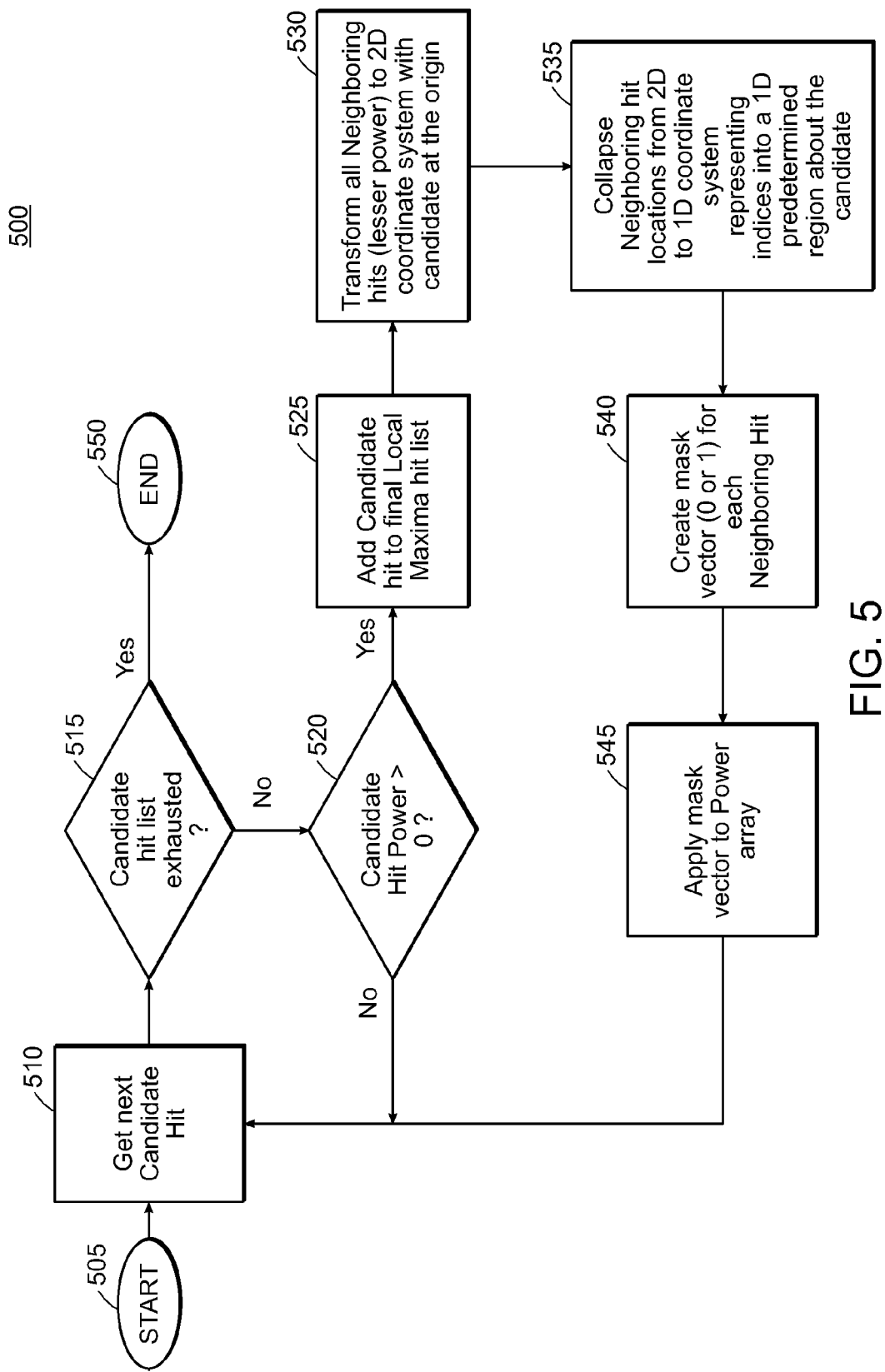
FIG. 5 is a flow diagram of another example method 500 for identifying local maxima.

FIG. 5 is a flow diagram of another example method 500 for identifying local maxima. At 505, the method 500 begins. At 510, the method 500 selects a next candidate hit from an array of available candidate hits (e.g., candidate hit list). At 515, the method 515 determines whether the candidate hit list is exhausted. If the list is exhausted, the method 500, at 550 ends. If the list is not exhausted, the method 500, at 520, determines whether the candidate hit from the list has a power value greater than '0'. If not, the method 500, at 510, selects a next candidate hit from the candidate hit list. If the candidate hit power is greater than '0', the method 500, at 525, adds the candidate hit to a local maxima hit list. At 530, the method 500 transforms all neighboring candidate hits about the candidate hit to a 2-dimensional coordinate system with the candidate hit at the origin of such a coordinate system. It should be noted that the 2-dimensional coordinate system may determine locations of neighboring hits based on an offset of the neighboring hits from the candidate hit. It should also be noted, that method 500 describes an implementation associated with a 2-dimensional data set. However, method 500 may be adapted to perform for any N-dimensional data set.

Contemporaneously, at 535, method 500 transforms the neighboring hits from a 2-dimensional coordinate system to a masking coordinate system. In other words, method 500, represents the 2-dimensional coordinate system of neighboring hits in a 1-dimensional array. Subsequently, at 540, method 500 determines a respective mask value ('0' or '1') for each neighboring hit. For instance, a neighboring hit within an isolation region of the candidate hit is given a respective mask value of '0', while a neighboring hit outside the isolation region is given a respective mask value of '1'. At 545, method 500 applies the mask value to a power array associated with the neighboring hits. In particular, method 500 performs a vector multiplication of the power array and the array of mask values, thereby eliminating neighboring hits within the isolation region of the candidate hit (i.e., multiplying an element of the power array by '0' results in a corresponding element in an array with a value of '0'). At 510, method selects a next candidate hit. Method 500 ends, at 550, when method 500, at 515, determines that the candidate hit list is exhausted.

Further example embodiments of the present invention may be configured using a computer program product; for example, controls may be programmed in software for implementing example embodiments of the present invention. Further example embodiments of the present invention may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A local maxima detection system, the system comprising:
   an interface configured to receive at least one array of available candidate hits, each hit including a location in N dimensions and a power value, the array of candidate hits being sorted based on the power value;
   a neighboring hits processor configured to, for each candidate hit of the array, identify a plurality of neighboring hits of the candidate hit in the array of available candidate hits;
   a candidate hit removal processor configured to remove a subset of the plurality of neighboring hits within an isolation region about the candidate hit from the array of available candidate hits;
   a vector collapsing processor configured to represent the location of the neighboring hits relative to the location of the candidate hit in a 1-dimensional location array;
   a vector masking processor configured to generate a mask using a 1-dimensional description of at least the isolation region; and
   the vector masking processor configured to apply the mask to the 1-dimensional location array, the mask removing neighboring hits within the isolation region about the candidate hit from the 1-dimensional location array and the array of available candidate hits.

2. The system of claim 1 wherein each available candidate hit represents a pixel described entirely by a location in at least two dimensions and the power value corresponds to an intensity.

3. The system of claim 1 wherein the neighboring hits processor is further configured to:
   begin from the candidate hit having the greatest power value relative to the other candidate hits in the array of available candidate hits; and
   identify a plurality of neighboring hits of the candidate.

4. The system of claim 1 further comprising a vector location processor configured to, for each of the N-dimensions of the neighboring hits, compute a vector representing a location of the neighboring hits relative to the location of the candidate hit.

5. The system of claim 1 further comprising a vector clipping processor configured to clip remaining neighboring hits to a clipping region about the candidate hit, the clipping region bordering the isolation region.

6. The system of claim 4 further comprising:
   an absolute value vector converter configured to compute an absolute value of the N vectors representing the location of each of the neighboring hits relative to the candidate hit.

7. A method of maximum location detection, executed by an image processing system, the method comprising:
   receiving at least one array of available candidate hits, each hit including a location in N dimensions and a power value, the array of candidate hits being sorted based on the power value;
   for each candidate hit of the array, identifying a plurality of neighboring hits of the candidate hit in the array of available candidate hits;
   removing a subset of the plurality of neighboring hits within an isolation region about the candidate hit from the array of available candidate hits;
   representing the location of the neighboring hits relative to the location of the candidate hit in a 1-dimensional location array;
   generating a mask using a 1-dimensional description of at least the isolation region; and
   applying the mask to the 1-dimensional location array, the mask removing neighboring hits within the isolation region about the candidate hit from the 1-dimensional location array and the array of available candidate hits.

8. The method of claim 7 wherein each available candidate hit represents a pixel described entirely by a location in at least two dimensions and the power value corresponds to an intensity.

9. The method of claim 7 wherein identifying a plurality of neighboring hits of the candidate hit and removing the plurality of neighboring hits from the array of available candidate hits includes beginning from the candidate hit having the greatest power value relative to the other candidate hits in the array of available candidate hits.

10. The method of claim 7 further comprising for each of the N-dimensions of the neighboring hits, computing a vector representing a location of the neighboring hits relative to the location of the candidate hit.

11. The method of claim 7 further comprising:
    clipping remaining neighboring hits to a clipping region about the candidate hit, the clipping region bordering the isolation region.

12. The method of claim 10 wherein removing the plurality of neighboring hits includes:
    computing an absolute value of the N vectors representing the location of each of the neighboring hits relative to the candidate hit.

* * * * *